(12) United States Patent
Wengrovitz et al.

(10) Patent No.: US 8,928,756 B2
(45) Date of Patent: Jan. 6, 2015

(54) SURVEILLANCE VIDEO ROUTER

(75) Inventors: Michael S. Wengrovitz, Concord, MA (US); Brian A. Barber, Grafton, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 508 days.

(21) Appl. No.: 12/984,491

(22) Filed: Jan. 4, 2011

(65) Prior Publication Data

US 2012/0098969 A1   Apr. 26, 2012

Related U.S. Application Data

(60) Provisional application No. 61/405,698, filed on Oct. 22, 2010.

(51) Int. Cl.
*H04N 7/18* (2006.01)
(52) U.S. Cl.
CPC .............. *H04N 7/185* (2013.01); *H04N 7/181* (2013.01)
USPC ....................................................... 348/159
(58) Field of Classification Search
CPC ............................. H04N 7/181; H04N 7/185
USPC .................. 348/143, 159; 725/105; 370/401; 709/231, 227, 228; 379/221.1; 713/173; 340/937; 702/181
See application file for complete search history.

(56) References Cited

U.S. PATENT DOCUMENTS

| 6,987,849 | B2 * | 1/2006 | Ravishankar | 379/221.1 |
| 7,519,504 | B2 * | 4/2009 | Goldman et al. | 702/181 |
| 8,339,282 | B2 * | 12/2012 | Noble et al. | 340/937 |
| 2002/0054215 | A1 | 5/2002 | Mizoguchi | |
| 2003/0062997 | A1 * | 4/2003 | Naidoo et al. | 340/531 |
| 2003/0204599 | A1 * | 10/2003 | Trossen et al. | 709/227 |
| 2005/0273831 | A1 | 12/2005 | Slomovich | |
| 2006/0161960 | A1 * | 7/2006 | Benoit | 725/105 |
| 2007/0204316 | A1 * | 8/2007 | Inamura et al. | 725/105 |
| 2008/0288986 | A1 * | 11/2008 | Foster et al. | 725/62 |
| 2009/0074184 | A1 | 3/2009 | Baum | |
| 2009/0234965 | A1 * | 9/2009 | Viveganandhan et al. | 709/231 |
| 2009/0245268 | A1 * | 10/2009 | Pugliese, IV | 370/401 |
| 2010/0005180 | A1 * | 1/2010 | Tyukasz et al. | 709/228 |

(Continued)

FOREIGN PATENT DOCUMENTS

| JP | 2002262264 A | 9/2002 |
| JP | 2003046977 A | 2/2003 |
| JP | 2005210674 A | 8/2005 |
| JP | 2007104040 A | 4/2007 |

OTHER PUBLICATIONS

International Search Report and Written Opinion for PCT/US2011/053357 dated Jan. 12, 2012 (9 pages).

*Primary Examiner* — Sath V Perungavoor
*Assistant Examiner* — Peter D Le
(74) *Attorney, Agent, or Firm* — Garlick & Markison

(57) ABSTRACT

A surveillance video router routes digital video streams to video receiving devices. The surveillance video router is coupled to a packet-switched network to enable communication with the video receiving devices and to receive respective digital video streams captured by remote surveillance cameras. The surveillance video router receives a request to route a first digital video stream generated by a first remote surveillance camera to a first video receiving device and then routes the first digital video stream to the first video receiving device via the packet-switched network.

20 Claims, 11 Drawing Sheets

(56) References Cited

U.S. PATENT DOCUMENTS

| | | | |
|---|---|---|---|
| 2010/0097473 A1* | 4/2010 | Park et al. | 348/159 |
| 2011/0002220 A1* | 1/2011 | Park et al. | 370/230 |
| 2011/0058034 A1* | 3/2011 | Grass | 348/143 |
| 2011/0258453 A1* | 10/2011 | Mansfield | 713/173 |

* cited by examiner

SURVEILLANCE VIDEO ROUTER

CROSS-REFERENCE TO RELATED APPLICATIONS

The present U.S. Utility patent application claims priority pursuant to 35 U.S.C. §119(e) to the following U.S. Provisional Application Ser. No. 61/405,698, entitled "Surveillance Video Router," filed Oct. 22, 2010, which is hereby incorporated herein by reference in its entirety and made part of the present U.S. Utility patent application for all purposes:

BACKGROUND OF THE INVENTION

1. Technical Field of the Invention

The present invention relates in general to video surveillance systems and in particular, to viewing digital video streams from video surveillance cameras.

2. Description of Related Art

Video surveillance systems with cameras streaming standard and high-definition video over IP networks to digital recorders, video analytics systems, video management displays and other observing devices/systems are becoming commonplace in the market. Camera network systems can found in airports, on city streets, in transportation facilities, in public shopping malls, in retail establishment chains, and elsewhere. The features of such systems enhance protection of people, assets and property. Small, medium and large camera networks currently exist with multiple observers remotely located anywhere on locally connected or wide area networks.

In the typical existing video surveillance system, each observer selects which camera or cameras are to be viewed. For example, a human observer using a PC-based Video Management. System (VMS) manually selects one or more cameras from a table, list, or map. After suitably interacting with the VMS's graphical user interface, the human observer views the real-time video streams from the selected cameras.

For IP-cameras, HTTP-based streaming protocols are typically used, so that an observer who enters the proper URL can view the real-time video stream in a browser client. For example, an observer can enter the URL manually, or after receiving the URL within a text message or an email triggered by an alarm condition. However, the observer must connect directly to the URL, and therefore must have knowledge of the URL to access the video stream.

In many scenarios, it is impossible or impractical for a human observer to manually select cameras to be viewed. For example, consider a situation when a police officer is driving a police ear to the scene of an emergency that has video surveillance cameras deployed. Although it would be extremely useful for the officer to view real-time video from one or more surveillance cameras while travelling to the emergency scene, manual interaction with the PC screen by the officer while driving at potentially high-speeds is dangerous. Furthermore, the officer typically does not know which camera or cameras would be most appropriately selected for viewing. This information may better be known by the dispatcher in the city's central emergency network operating center, who may have access to a video wall showing many/all cameras, as well as to other resources and assets. Although such a third-party dispatcher may be in the best position to select which video streams should be pushed/routed to the officer, there is currently no mechanism for allowing a third party to select a video stream.

Therefore, what is needed is a surveillance video router capable of routing IP-based digital video streams to observers and controllable by a third party to route the appropriate digital video streams to observers.

SUMMARY OF THE INVENTION

A surveillance video router, in one embodiment, routes digital video streams to video receiving devices. The surveillance video router includes a network interface coupled to a packet-switched network to enable communication with the video receiving devices and to receive respective digital video streams captured by remote surveillance cameras. The surveillance video router further includes a processor for receiving a request to route a first digital video stream generated by a first remote surveillance camera to a first video receiving device via the network interface. The processor further routes the first digital video stream to the first video receiving device via the network interface.

In an exemplary embodiment, the request is received from the first video receiving device. In another exemplary embodiment, the request is received as a control input from a third party source.

In a further embodiment, the surveillance video router includes a plurality of logical source ports, each for receiving one of the digital video streams and a plurality of logical destination ports, each for communicating with at least one of the video receiving devices. The processor copies the first digital video stream from a respective one of the logical source ports for the first digital video stream to a respective one of the logical destination ports for the first video receiving device to route the first digital video stream to the first video receiving device.

In another embodiment of the invention, a method is provided for routing digital video streams captured by remote surveillance cameras to video receiving devices. The method includes receiving a request to route a first digital video stream generated by a first remote surveillance camera to a first video receiving device at a surveillance video router via a packet-switched network, receiving the first digital video stream from the first remote surveillance camera at the surveillance video router via the packet-switched network and routing the first digital video stream to the first video receiving device by the surveillance video router.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
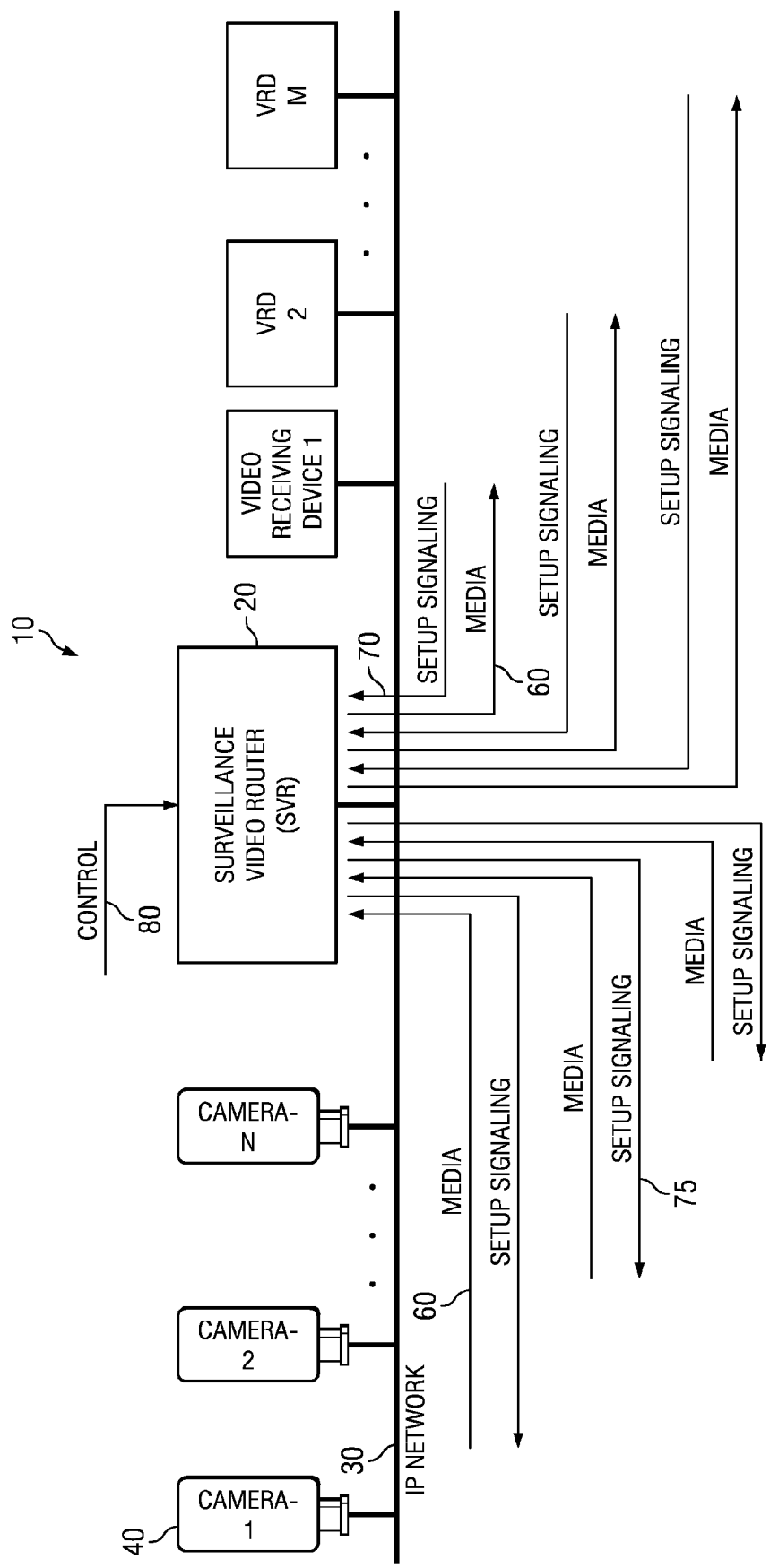
FIG. 1 illustrates an exemplary digital video system including a surveillance video router for routing digital video streams captured by remote surveillance cameras to video receiving devices, in accordance with embodiments of the present invention.

In accordance with embodiments of the present invention, a surveillance video router is provided that acts as a network infrastructure element controlling the switching/routing of video streams from IP-based surveillance cameras to video receiving devices. FIG. 1 illustrates an exemplary digital video system 10 for routing digital video streams captured by remote video surveillance cameras 40 to one or more video receiving devices 50, in accordance with embodiments of the present invention. The system 10 includes the remote video surveillance cameras (camera-1, camera-2 . . . camera-N) 40, the video receiving devices (VRD 1, VRD 2 . . . VRD M) 50 and the surveillance video router (SVR) 20. By way of example, but not limitation, the video receiving devices 50 may be Video Management Systems (VMS), networked video recorders, video analytic systems, additional surveillance video routers, browsers or display devices. Examples of display devices include devices having a single display, such as a mobile communication device, a personal computer, a laptop computer or a security system display device, or devices having multiple displays, such as a security system video wall.

The SVR 20, cameras 40 and video receiving devices (VRDs) 50 communicate through a packet-switched network 30, such as an Internet Protocol (IP) network or other type of network. As such, the SVR 20 uses logical processing instead of complex physical electronic circuits, as would be required by a traditional circuit-switched network, thereby yielding superior scalability, overcoming cable distance limitations and providing access to non-tethered (wireless) IP-based mobile devices. Furthermore, the logical processing in the packet-switched based SVR 20 facilitates and simplifies the introduction of new features, functionality, and upgrades that simply cannot be performed using the fixed electronic circuits found in traditional circuit-switched video routers.

The SVR 20 routes the digital video streams captured by the remote video surveillance cameras 40 in real-time to one or more of the VRDs 50. In particular, the SVR 20 routes digital video streams to VRDs 50 on request. The request can be initiated by the VRD 50 or by an external third party source via a control interface 80.

For example, in one embodiment, the VRDs 50 can establish respective signaling connections 70 with the SVR 20 and request to receive the digital video stream(s) 60 from one or more cameras 40. In addition, the SVR 20 can set-up separate media sessions 75 with one or more cameras 40 to receive the media (digital video streams) 60 from the cameras 40. The SVR 20 can establish the media sessions 75 with the cameras 40 prior to or as a result of receiving the request. Either way, upon receiving the request, the SVR 20 routes the requested video media 60 from the cameras 40 to the VRDs 50. In effect, the surveillance video router 20 acts as a proxy between the cameras 40 and the VRDs 50.

In another embodiment, the SVR 20 can receive a request via the control interface 80 from a third party source to suitably route the digital video stream(s) 60 from one or more cameras 40 to one or more VRDs 50. In this embodiment, the SVR 20 can also establish the signaling connections with the cameras 40 prior to or as a result of receiving the request and route the requested digital video streams 60 to the appropriate VRDs 50.

The SVR 20 can also implement both unicast and multicast IP distribution schemes. For example, some cameras 40 could be switched/routed using unicast, whereas other cameras could be switched/routed using multicast to distribute the digital video streams 60 to multiple VRDs 50. In other embodiments, the SVR 20 may also be able to receive multicast streams and route the multicast streams as unicast or multicast streams to one or more VRDs 50.

Figure 2:
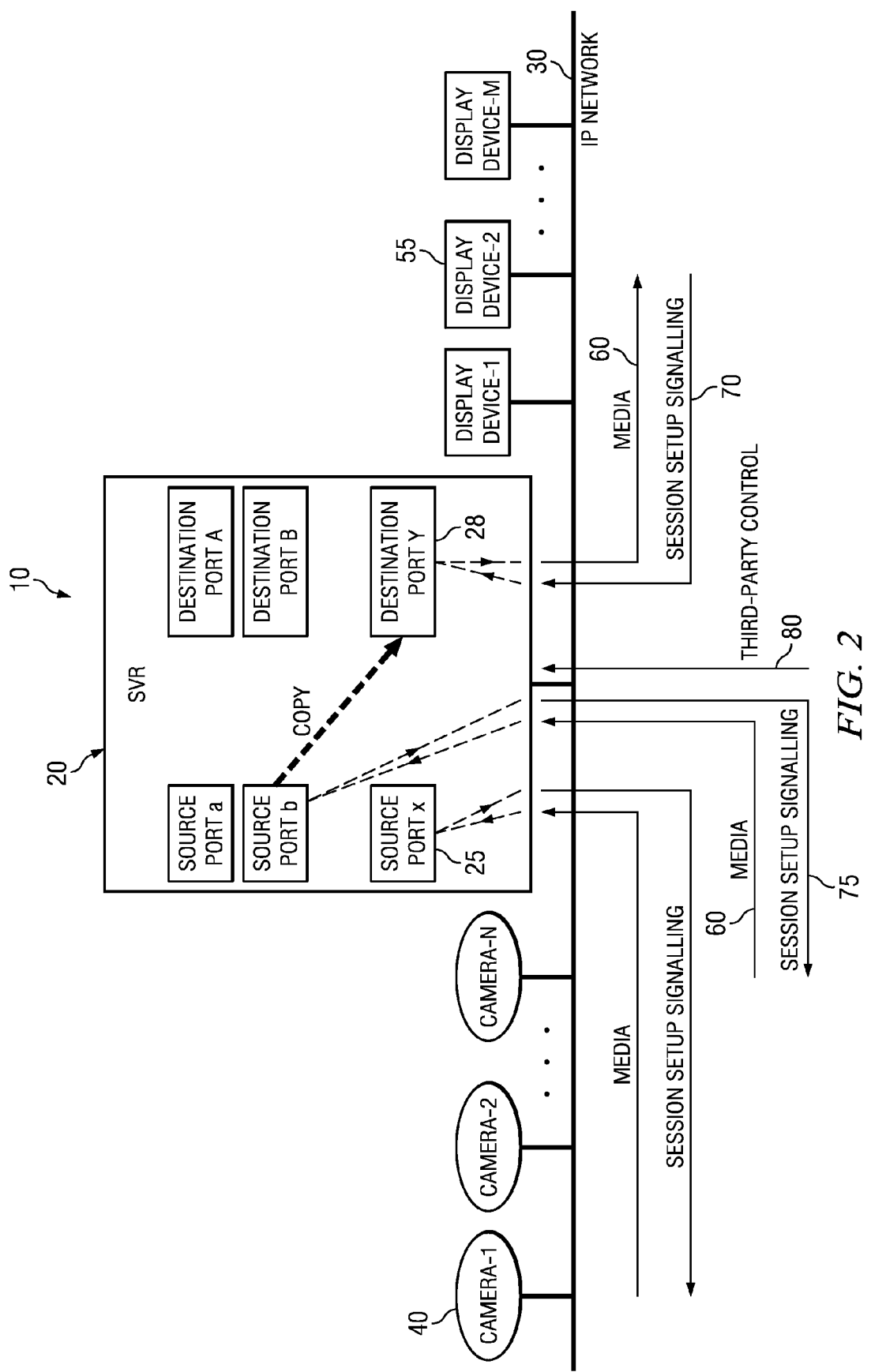
FIG. 2 illustrates an exemplary digital video system including a surveillance video router for routing digital video streams captured by remote surveillance cameras to display devices, in accordance with embodiments of the present invention.

Referring now to FIG. 2, there is illustrated an exemplary system 10 for routing digital video streams from cameras 40 to VRD display devices 55 via the SVR 20, in accordance with embodiments of the present invention. Although FIG. 2 is described in terms of routing video streams to display devices, it should be understood that the following can also be equally applied to other types of VRDs.

As described above, display devices 55 (e.g., Display Device 1, Display Device 2 . . . Display Device M) may include, for example, devices having a single display, such as a mobile communication device, a personal computer, a laptop computer or a security system display device, or devices having multiple displays, such as a security system video wall. Each display device 55 may be operated by an observer viewing one or more digital video streams 60 from one or more cameras 40.

In an exemplary embodiment, in order for an observer of a particular display device 55 (e.g., Display Device 2) to view the digital video stream from a particular camera (e.g., Camera-N), Display Device 2 sets up a video session with the SVR 20 using appropriate Session Setup signaling 70. As shown in FIG. 2, display devices 55 can contact the SVR 20 on various logical Transmission Control Protocol (TCP) ports, referred to herein as Destination Ports 28 (e.g., Destination Port A, Destination Port B . . . Destination Port Y). For example, Display Device 2 can issue a Session Setup Signaling HTTP request to Destination Port Y at the SVR's IP address. The Session Setup Signaling request can include, for example, the URL of the camera whose digital video stream 60 the display device 55 would like to view.

In similar fashion, the SVR 20 initiates video sessions with cameras 40 on various logical TCP ports, referred to herein as Source Ports 25 (e.g., Source Port a, Source Port b . . . . Source Port x). For example, the SVR 20 can issue a Session Setup Signaling HTTP (Hyper Text Transfer Protocol) request from the SVR IP address and a particular source port (e.g., Source Port x) to Camera-1, and a Session Setup Signaling HTTP request from the SVR IP address and Source Port b to Camera-N. Media 60 is returned from each of the cameras (Camera-1 and Camera-N) to the SVR within the HTTP responses.

In one embodiment, the SVR 20 initiates sessions with all cameras 40 on a list, independent of what sessions are requested by VRDs (e.g., display devices 55). In this manner, some or all cameras 40 are always streaming to the SVR 20, whether or not they are actually being switched/routed to any display devices 55. In another embodiment, a request from a VRD arriving at a particular SVR Destination Port triggers the setup of one or more sessions by the SVR 20 to one or more cameras 40. In yet another embodiment, the SVR 20 sets up sessions with cameras 40 via the SVR's control interface 80. In this embodiment, an external application (third party source) controls the SVR 20 and commands it as to when and which camera 40 streams should be setup.

To route the digital video streams to the appropriate display devices 55, the SVR 20 internally copies media 60 received on Source Ports to Destination Ports. For example, the SVR 20 can copy the media 60 received on Source Port b to Destination Port Y to route the digital video stream from Camera-N to Display Device 2. The digital video stream 60 can be contained within, for example, the HTTP response from the SVR 20. As an example, the digital video stream 60 can be sent as Real Time Streaming Protocol (RTSP) over Real Time Protocol (RTP) packets or as a series of Motion Joint Photographic Experts Group (MJPEG) frames.

It should be noted that a large number of digital video streams 60 can exist in parallel to/from/within the SVR 20, although for simplicity purposes only a few such streams are depicted in FIG. 2. For example, a typical SVR 20 may have tens, hundreds or even thousands of digital video streams 60 being switched/routed simultaneously. It should also be noted that the terms "IP Source Ports" and "IP Destination Ports" are merely illustrative, and many other types of logical implementations are possible using various stream identification mechanisms, such as tuples, source/destination specification IDs, etc.

Figure 3:
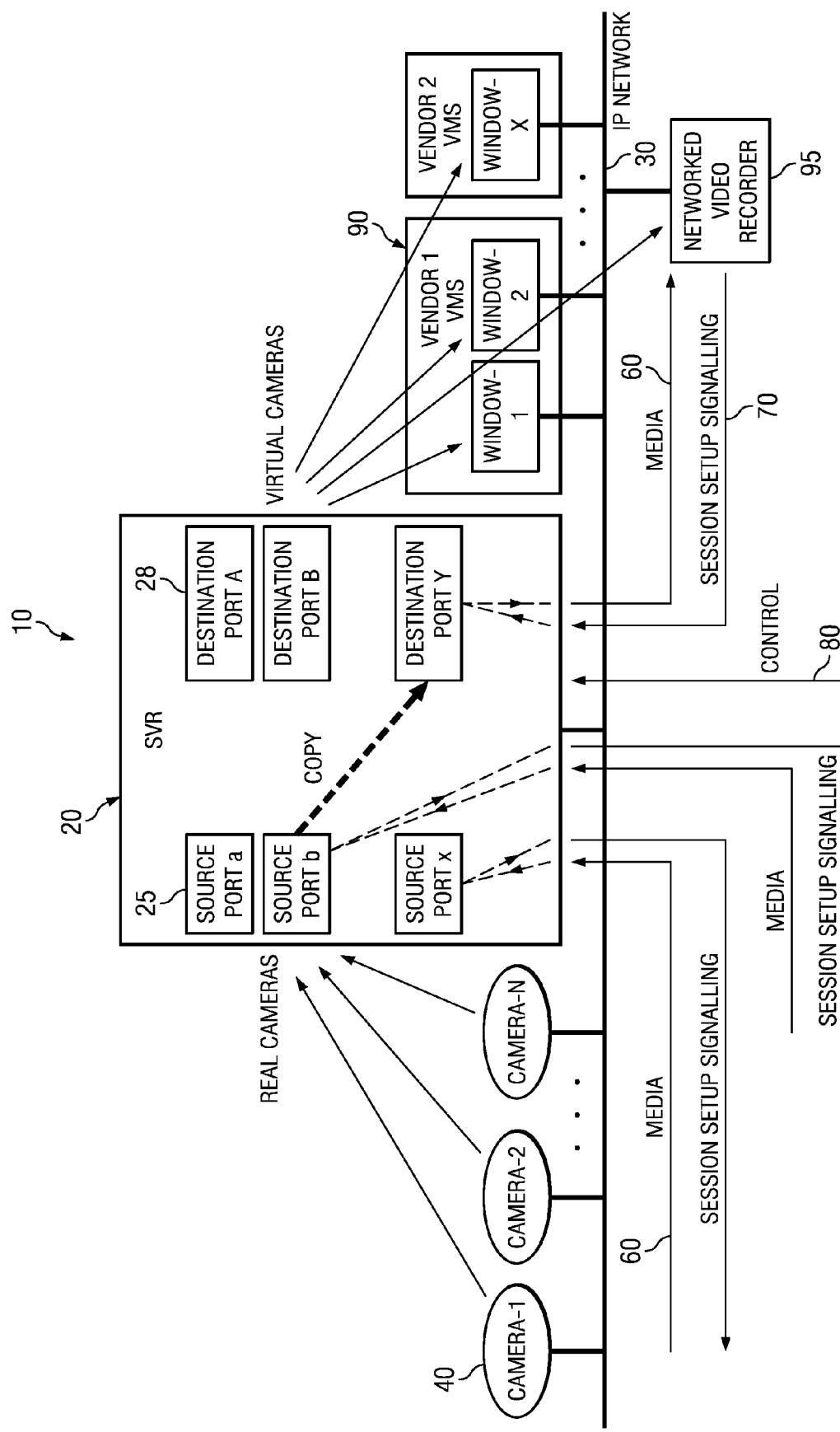
FIG. 3 illustrates an exemplary digital video system including a surveillance video router for routing digital video streams captured by remote surveillance cameras to other types of video receiving devices, in accordance with embodiments of the present invention.

Referring now to FIG. 3, it can be seen that the VRDs can also include various types of video surveillance clients, such as display windows within multiple Video Management Systems 90 from various vendors, networked video recorders 95, browsers, video analytic systems, and other similar video clients. In addition, as can also be seen in FIG. 3, instead of initiating a session with an actual camera, the video receiving device (i.e., VMS 90 or recorder 95) initiates a session with the SVR 20. In essence, the SVR 20 acts as bank of virtual cameras. The VRD is completely unaware that it is involved in a video session with a virtual camera, not a real camera. Furthermore, each camera 40 is completely unaware that it is involved in a video session with the SVR 20, not a real VRD. Thus, the SVR 20 operates as a "man-in-the-middle" server, proxying media and signaling between many types of cameras 40 and VRDs 90/95.

Different VRDs 90/95 may setup sessions with the SVR 20 using different Session Setup Signaling protocols. For example, a VMS manufactured by Vendor 1 may use one type of Session Setup Signaling protocol and syntax, whereas a VMS manufactured by Vendor 2 may use another type of Session Setup Signaling protocol and syntax. The SVR 20 can accommodate these variations in protocol and syntax.

In one embodiment, the SVR 20 uses information in the setup request 70 from a particular VRD 90/95, such as the URL format, the IP address of the requester, and/or other information, to adaptively derive the type of Session Setup Signaling protocol. In another embodiment, the SVR 20 supports specific types of Session Setup Signaling protocols on specific Destination Ports. For example, Destination Ports 1000-1999 may be reserved for contact from Vendor 1's VMS 90, Destination Ports 2000-2999 may be reserved for contact from Vendor 2's VMS 90 and Destination Ports 11000-11049 may be reserved for contact from Networked Video Recorder 95. When the complete system is assembled, installed and configured, the VRDs 90/95 and SVR 20 are suitably managed according to the configuration.

The SVR 20 may also accommodate camera-dependent Session Setup Signaling protocols. For example, the SVR 20 may issue one type of Session Setup Signaling protocol to a camera manufactured by Vendor 1, and another type of Session Setup Signaling protocol to a camera manufactured by Vendor 2. In one embodiment, the SVR 20 sets-up camera-dependent signaling according to a list (i.e., Camera-1 at IP Addr1 is setup with one vendor's Session Setup Signaling protocol, Camera-2 at IP Addr2 is setup with another vendor's Session Setup Signaling protocol, etc.). In another embodiment, Source Ports are associated with camera types. In this embodiment, when the SVR 20 is commanded to startup a session using Source Port x, the SVR 20 uses the Camera-specific vendor protocol Y.

In yet another embodiment, the SVR 20 sets up camera-specific Session Setup Signaling protocol using the SVR's control interface 80. For example, an API control command can be sent to the SVR 20 instructing the SVR 20 to setup a session with a particular camera at an IP address of the camera using the specific vendor's camera protocol.

In an exemplary embodiment, as shown in FIG. 3, the networked video recorder 95 sets up a video session with a particular destination port 28 (e.g., Destination Port Y) of the SVR 20 using appropriate Session Setup signaling 70. Likewise, the SVR 20 initiates a video session with Camera-N on a particular source port 25 (e.g., Source Port b) using appropriate Session Setup signaling 75. Thereafter, the SVR 20 internally copies media 60 received on Source Port b to Destination Port Y to suitably route the digital video stream from Camera-N to the networked video recorder 95.

Figure 4:
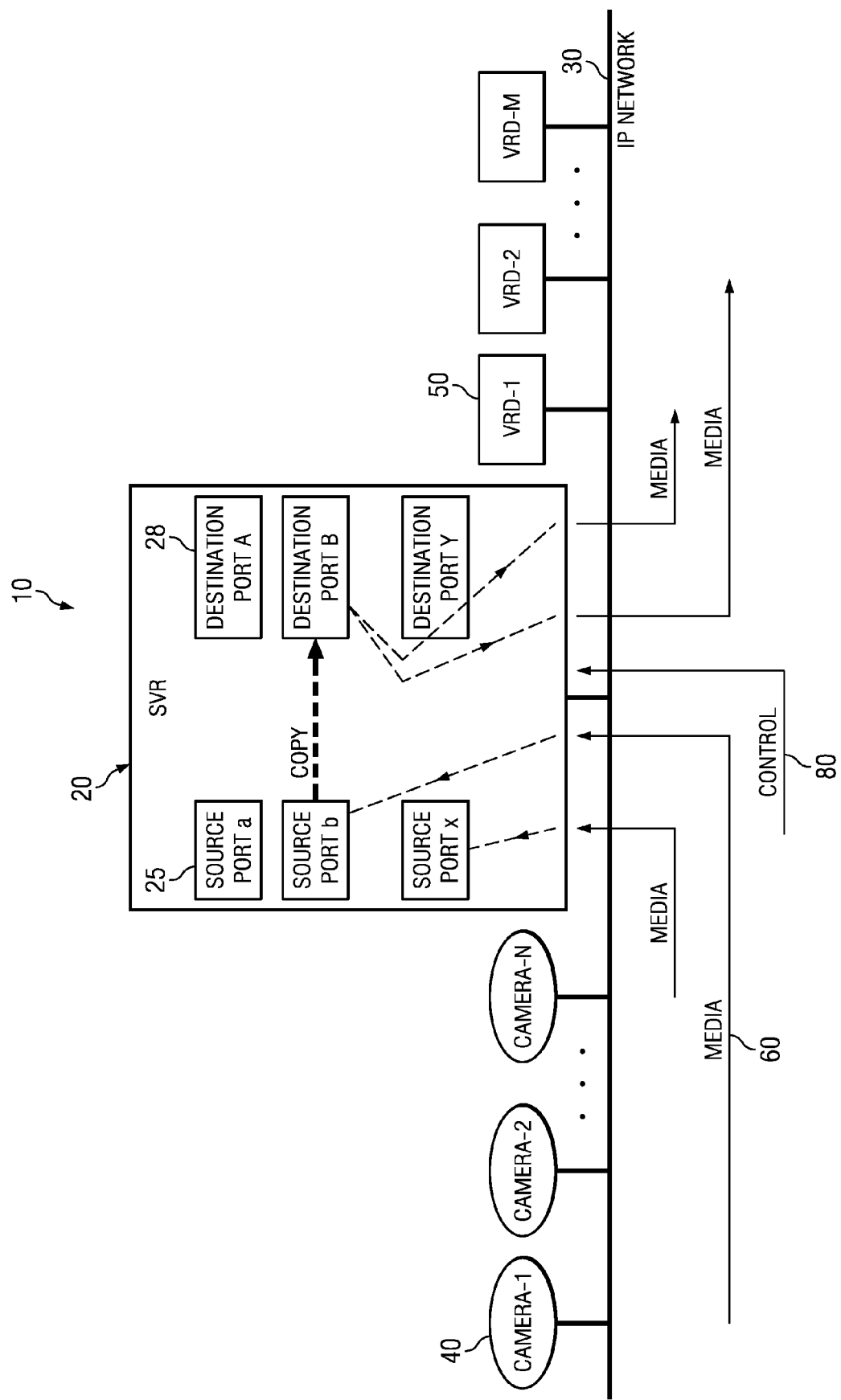
FIGS. 4-5 illustrate various routing mechanisms for routing a digital video streams captured by a remote surveillance camera to multiple video receiving devices, in accordance with embodiments of the present invention.

As a part of the switching/routing process, the SVR 20 can also perform a "fanout" or a "one-to-many" distribution of a stream. One embodiment of a "fanout" is shown in FIG. 4. In FIG. 4, multiple video receiving devices 50 (e.g., VRD 1 and VRD 2) are connected to same SVR Destination Port 28 (e.g., Destination Port B). When the SVR 20 is instructed to copy over media from a Source Port (e.g., Source Port b) to Destination Port B via, for example, a control input from control interface 80, VRD 1 and VRD 2 see the same changed stream. For example, at a particular point in time, as can be seen in FIG. 4, VRDs 1 and 2 both receive the digital video stream 60 from Camera-1, whereas at a different time (not shown), VRDs 1 and 2 may both receive the digital video stream from a different camera.

Figure 5:
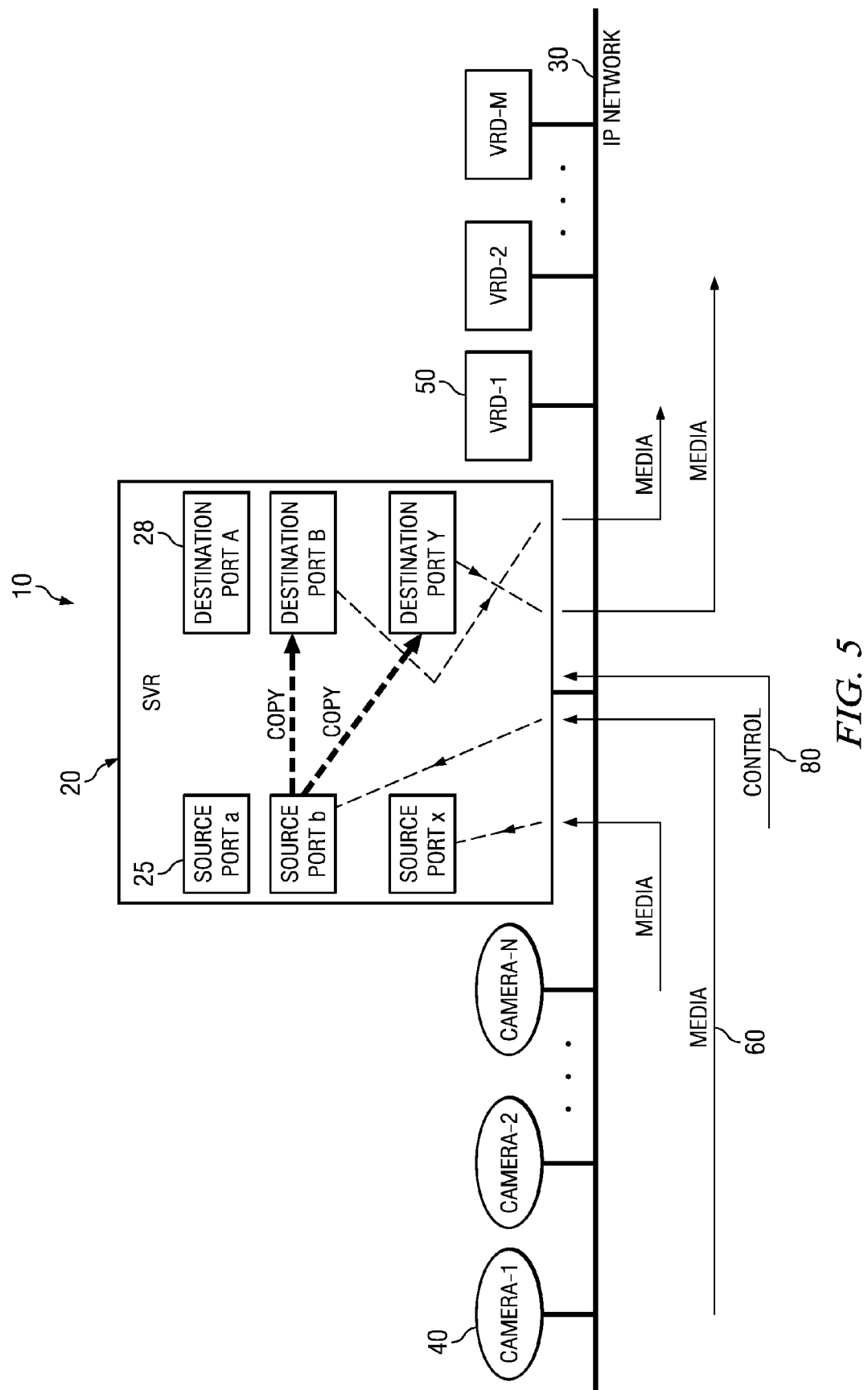

In another embodiment, as shown in FIG. 5, the video 60 from a camera is copied, i.e., fanned-out, to multiple destination ports. Therefore, two VRDs can receive the digital video stream from the same camera at one time and from two different cameras at another time. For example, as shown in FIG. 5, VRD 1 is connected to Destination Port B and VRD 2 is connected to Destination Port Y. The SVR 20 is configured such that the digital video stream 60 from Camera-1 received at Source Port b is copied over to both Destination Port B and Destination Port Y to enable both VRD 1 and VRD 2 to receive Camera-1's stream.

The SVR 20 can also integrate with cameras 40 that support multiple simultaneous connections. Therefore, in yet another "fanout" embodiment, Source Port x may connect to Camera-1 and Source Port b may also simultaneously connect to Camera-1. These two source ports 25 (Source Port x and Source Port b) can then be suitably copied to SVR Destination Ports 28 as required.

Figure 6:
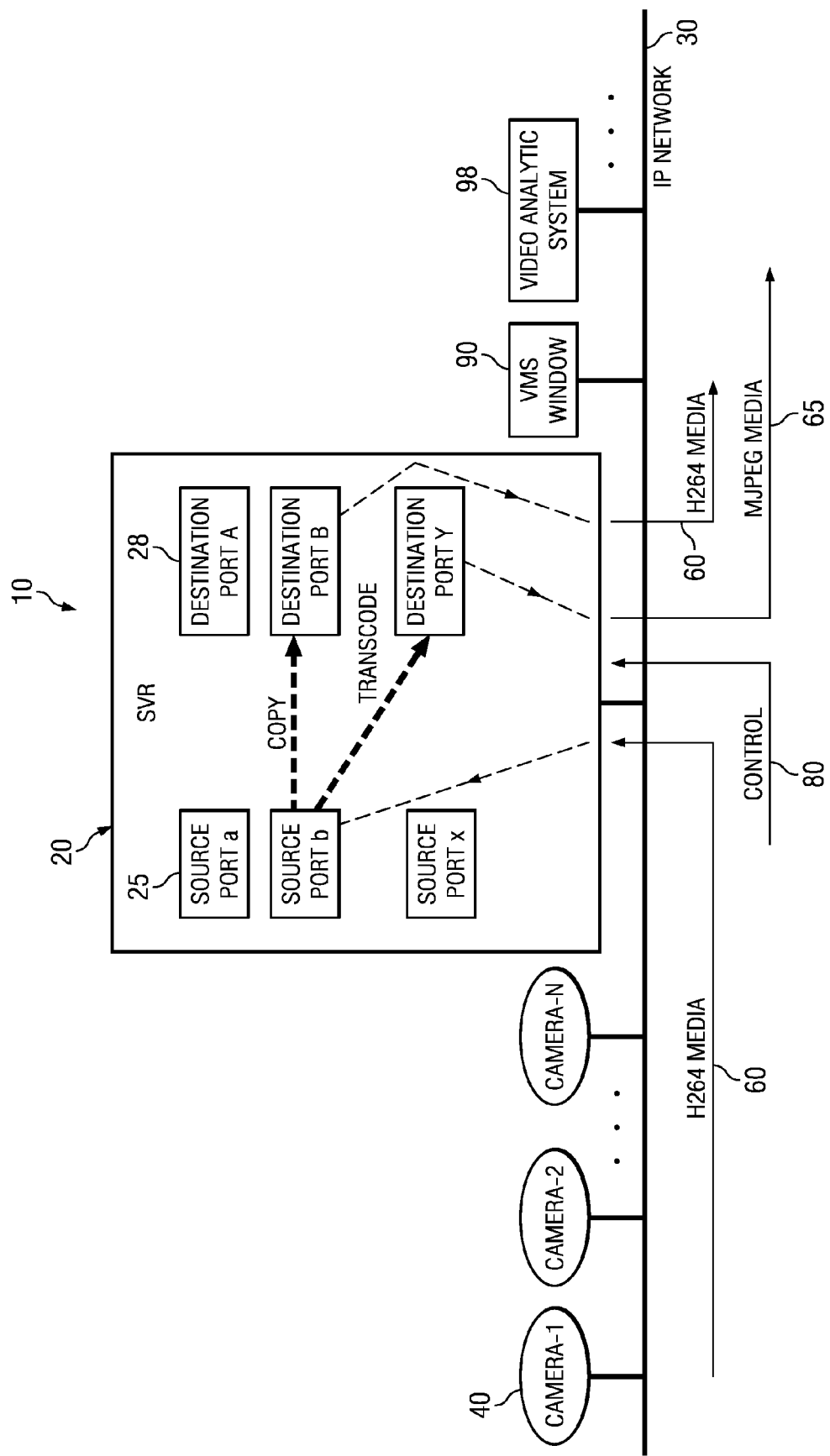
FIG. 6 illustrates an exemplary transcoding mechanism for transcoding digital video streams prior to routing to one or more video receiving devices, in accordance with embodiments of the present invention.

FIG. 6 illustrates an exemplary transcoding mechanism for transcoding digital video streams 60 prior to routing to one or more video receiving devices 50, in accordance with embodiments of the present invention. Instead of simply moving or copying each packet, the SVR 20 can implement signal processing to transcode the video stream 60 to a different compression scheme. Many cameras and video receiving devices have the capability for encoding and decoding video media streams using different schemes, such as H264, MPEG-4, MJPEG, etc. The SVR 20 can change the stream's encoding as the stream traverses through the SVR 20 and then route the transcoded stream to one or more video receiving devices 90/98.

In an exemplary embodiment, as depicted in FIG. 6, a VMS window 90 and a video analytics system 98 may both have requested to view the same camera 40 (e.g., Camera-1). For network bandwidth purposes, it may be convenient for the camera-to-SVR and SVR-to-VRD communication to occur using H.264 encoding, which is bandwidth efficient because of inter-frame encoding. However, the video analytics system 98 may prefer for the digital video stream to be encoded using MJPEG encoding. For example, since MJPEG uses intraframe encoding and each frame contains the entire image, MJPEG frames may be conveniently signal processed by the video analytics system 98. Therefore, the SVR 20 maintains the small bandwidth between Camera-1 and the VMS window 90 by routing the H.264 digital video stream 60 from Camera-1 to the VMS window 90, while simultaneously transcoding the H.264 stream to MJPEG frames and routing the MJPEG media 65 to the video analytics system 98. Thus, implementing transcoding within the SVR 20 allows for the communication between cameras 40 and VRD's 90/98 to be optimally matched.

Figure 7:
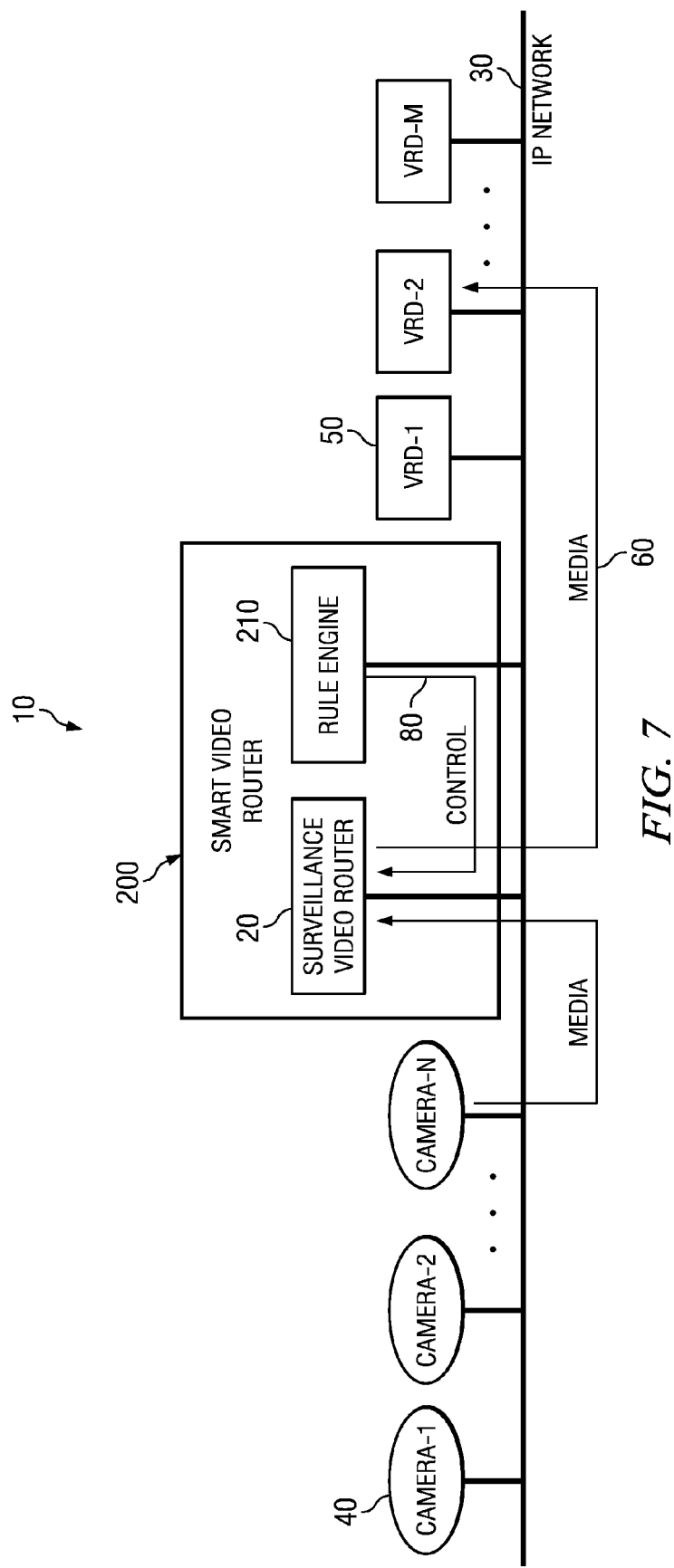
FIG. 7 illustrates an exemplary smart video router for providing third party control of the digital video stream routing, in accordance with embodiments of the present invention.

Turning now to FIG. 7, an exemplary smart video router 200 for providing third party control of the digital video stream routing is illustrated, in accordance with embodiments of the present invention. The smart video router 200 includes the SVR 20 and a rule-based engine 210 for performing intelligent and automatic or semi-automatic (e.g., human-assisted) switching/routing. The rule-based engine 210 is a third-party source that provides control input to the SVR 20 via the control interface 80. For example, as shown in FIG. 7, the control input may instruct the SVR 20 to route the digital video stream 60 from Camera-N to VRD-2.

In an exemplary embodiment, the rule-based engine 210 is a video analytic system capable of automatically tracking a specific vehicle or person of interest as it moves through a large field of cameras on a camera network. To enable a security official observer to view the vehicle or person of interest within a single window on a VMS display (e.g., on VRD-2), with an automatic and not manual selection of the camera, the video analytic system 210 can dynamically select which of the various video streams are most appropriately routed to the security official's display (VRD-2).

It should be understood that the control interface 80 to the SVR 20 has a rich set of extensions and variations. For example, multiple third-party sources may be able to access the SVR control interface(s) 80 with various roles. One third party source may be able to switch/route one subset of cameras or VRDs, while another third party source may be able switch/route another subset of cameras or VRDs.

Control may also be allowed with various types of authentication and according to various policies. For example, one third party source that authenticates at a higher level may be able to override, disable, or otherwise modify, another third party source's actions. In addition, different third party sources may attach to different network interfaces in various multiport SVR configurations. Furthermore, third party sources may be able to set parameters related to processing, transcoding, or Session Setup Signaling. Third party sources may also be attached to various kinds of customized graphical user interfaces, so that, for example, different drag-and-drop interfaces may determine the switching/routing performed by the SVR.

Figure 8:
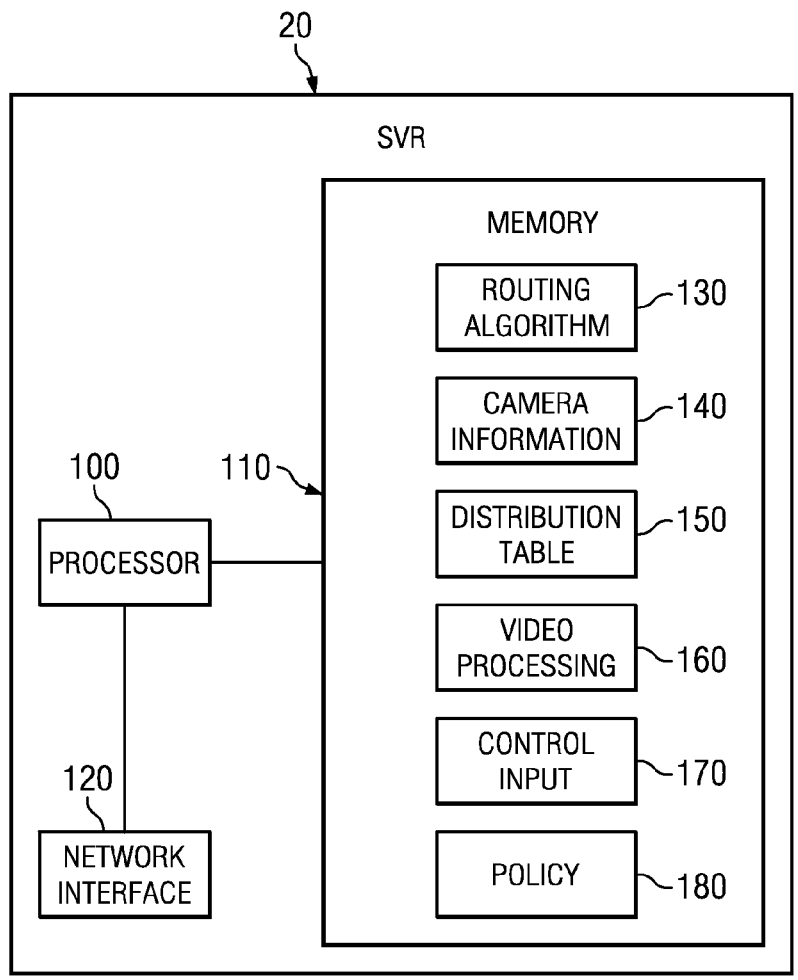
FIG. 8 is a block diagram illustrating various components of the surveillance video router, in accordance with embodiments of the present invention.

FIG. 8 is a block diagram of an exemplary SVR 20, in accordance with embodiments of the present invention. The SVR 20 includes a processor 100, memory 110 and a network interface (I/F) 120. The network interface 120 is coupled to a packet-switched (IP) network to communicate with remote video surveillance cameras and video receiving devices. Thus, as used herein, the term "network interface" refers to the point of interconnection between the SVR 20 and a private or public packet-switched network. The network interface is generally understood to be a network interface card (NIC), and the network interface 120 shown in FIG. 8 is understood to include one or more NIC's, each having its own separate IP address. However, in other embodiments, the SVR 20 may have two or more IP addresses on the same single NIC, so that the SVR 20 can straddle different networks with the same NIC using multi-homing.

The memory 110 maintains a routing algorithm 130, and the processor 100 is further coupled to the memory 110 to execute instructions of the routing algorithm 130. For example, the processor 100 can execute instructions of the routing algorithm 130 to route a digital video stream received on a particular Source Port to one or more Destination Ports.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

The memory 110 further maintains camera information 140. The camera information 140 includes, for example, an identifier for each camera (i.e., the URL for each camera) and an indication of whether each camera is on-line and currently transmitting digital video streams. The camera information 140 may also include camera characteristics, camera location, camera protocols and any other information associated with the camera. The memory 110 also maintains a distribution table 150 mapping which digital video streams are currently being routed to which VRD's 50. The distribution table 150 is updated by the routing algorithm 130 when new requests are received from VRD's or based on control input 170 received via the network interface 120. The distribution table 150 may also be updated by the routing algorithm 130 when a VRD and/or camera goes off-line.

The memory 110 may further include a video processing algorithm 160 executable by the processor 100. Examples of video processing algorithms 160 include, but are not limited to, contrast enhancement, background filtering, foreground filtering, megapixel camera zooming, tracking, multisensor fusion (multiple cameras sent to the same processing function), 3D processing, transcoding and other types of video processing. The processor 100 may execute the video processing algorithm for all digital video streams or only some of the digital video streams. In addition, the routing algorithm 130 may utilize the processing results of the video processing algorithm to determine the switching/routing to be performed on a particular digital video stream.

In addition, some surveillance cameras have the ability to implement pan/tilt/zoom (PTZ) via network control. For example, a camera may be configured to accept HTTP-based URLs typically generated by the user interface on a VMS system. The processor 100 may be configured to suitably proxy/relay pan/tilt/zoom (PTZ) signals received from VRDs to cameras. In yet another embodiment, the control input 170 may include PTZ commands to be sent back to cameras. For example, a network dispatch operator might use a GUI to control both the selection of cameras pushed/routed to first-responders as well as the camera's PTZ position. The processor 100 may also implement PTZ policies 180 stored in memory 110 or an external database. For example, the processor 100 may pass back the PTZ commands from some VRDs to some cameras, and not pass back the PTZ commands from other VRDs to the same or different cameras.

Figure 9:
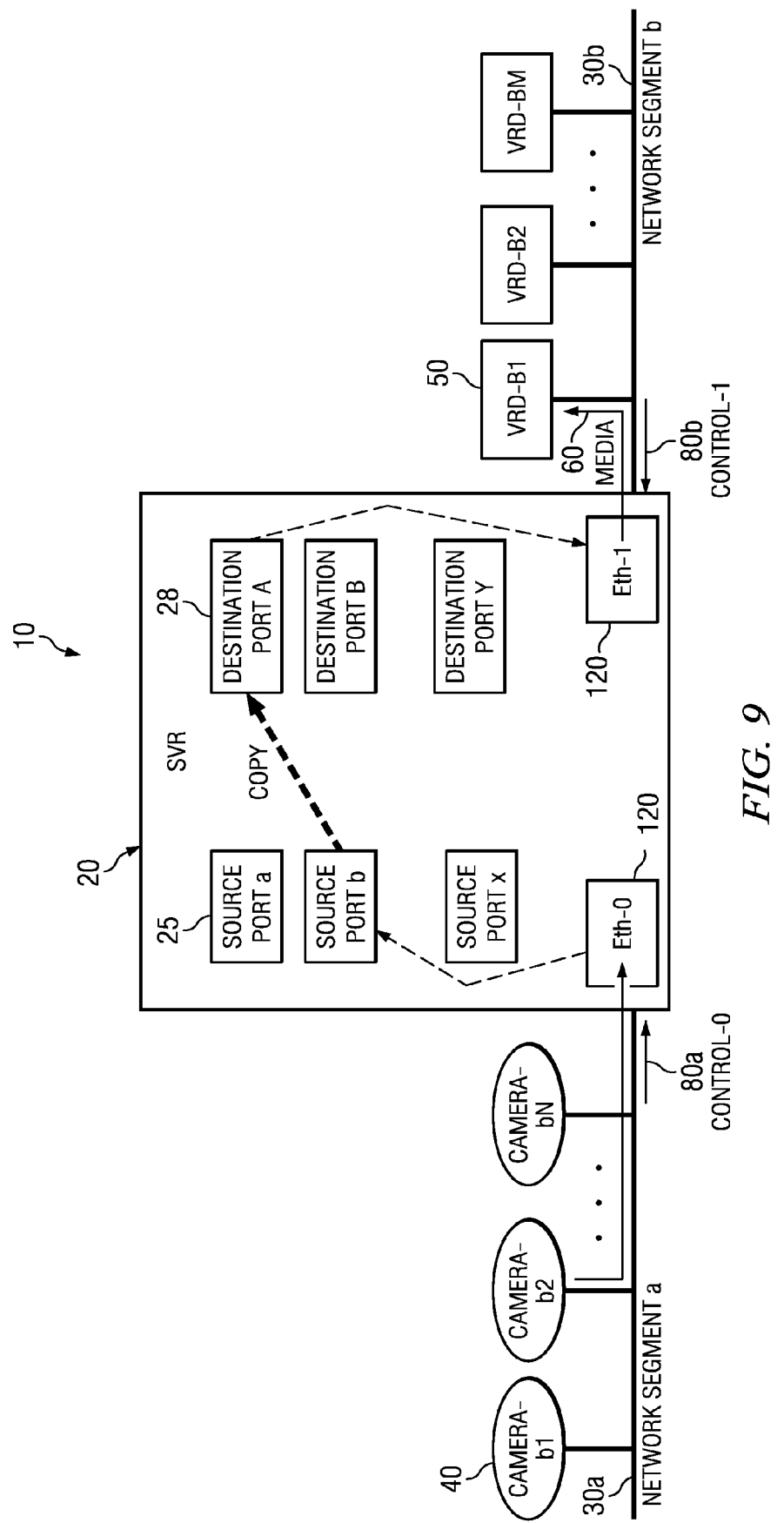
FIGS. 9-10 illustrates exemplary routing of digital video streams across disparate packet-switched networks, in accordance with embodiments of the present invention.

Referring now to FIG. 9, as described above, the SVR 20 may have multiple IP addresses, and/or multiple NIC cards, so that the SVR's switching/routing can occur across multiple and disparate networks. FIG. 9 depicts a system 10 in which the SVR 20 has two NICs 120 (Eth-0 and Eth-1), each coupled to a different network segment 30*a* and 30*b*, respectively. Media from the cameras 40 (Camera-b1, Camera-b2 . . . . Camera-bN) is sent over network segment 30*a* and routed to VRDs 50 (VRD-B1, VRD-B2 . . . VRD-BM) over network segment 30*b*. For example, as shown in FIG. 9, the digital video stream 60 from Camera-b2 is sent over Network Segment a and received at Source Port b of NIC Eth-0 of the SVR 20, where it is copied over to Destination Port A to be routed via NIC Eth-1 to VRD-B1 over Network Segment b.

In one embodiment, the two-port SVR is a PC server with two NIC cards executing SVR software. In another embodiment, the two-port SVR is a dedicated hardware device running embedded SVR firmware. In yet another embodiment, the two-port SVR is an IP-based data switch or router implementing SVR functionality, so as to thereby provide a Surveillance-Enabled Data Switch. It should be understood that there are many different possible architectures for the SVR 20, and only a few are described herein.

An example application of the two-port SVR 20 shown in FIG. 9 is a scenario in which the cameras 40 are on a private LAN 30*a*, and the VRDs 50 are remote on the internet 30*b* and/or behind remote NATs and firewalls across the internet. For simplicity, the Session Setup Signaling between cameras 40 and the Eth-0 NIC of the SVR 20 is not shown, nor is the Session Setup Signaling between the VRDs 50 and the SVR 20.

As can be seen in FIG. 9, in addition to performing the various switching operations described previously, the two-port SVR 20 acts as a conduit or border-control element between Network Segment-a (for example, a private LAN), and Network Segment-b (for example, the Internet). In this embodiment, the SVR 20 can perform NAT traversal and act as a session border controller for digital video surveillance media.

It should be noted that the control interfaces 80*a* and 80*b* to the SVR 20 may be exposed on one, the other, or both network interfaces (Eth-0 and Eth-1), depending on various embodiments and/or upon SVR management. The control interfaces 80*a* and 80*b* may also have various functions and roles depending on the network interface. For example, Control-0 may be used to setup and tear down sessions with cameras 40, whereas Control-1 may be used to control the copying, i.e. switching/routing process. As another example, Control-0 may allow copying of Source Ports a-m, whereas Control-1 may allow copying of Source Ports n-z.

Although the signaling is not shown in FIG. 9, it should be understood that in some embodiments, the signaling formats used on each network segment 30*a* and 30*b* may be incompatible, and therefore, the SVR 20 can also be used as a signaling bridge between the different network segments 30*a* and 30*b*. For example, in one embodiment, the signaling on one side (e.g., network segment b) may be Session Initiation Protocol (SIP), typically found used within enterprise and carrier networks for audio and video communication and video conferencing, whereas the signaling on the other side (e.g., network segment a) may be HTTP or RTSP-based, which is typically used in video surveillance systems. Although the encoding of the actual video media itself uses the same types of compression schemes, such as H.264, the Session Setup Signaling formats are completely incompatible. For example, a typical SIP-based video conferencing endpoint (e.g., one of the VRD's 50) used for telepresence, enterprise meetings, etc., cannot call a typical video surveillance camera. The SVR 20 can perform signaling conversion to bridge together SIP-based communication clients (VRDs 50) with surveillance cameras 40.

In an exemplary embodiment, a SIP video conferencing system can dial a video surveillance camera via the SVR 20 or add one more additional video surveillance cameras to an existing telepresence video conference via the SVR 20. In another exemplary embodiment, a sensor event may trigger an SVR control command that causes the SVR to dial-out to SIP endpoints with video media from one or more surveillance cameras. In yet another exemplary embodiment, the same telecom equipment used by a city government for its video conference meetings could also be used to view the city's surveillance cameras via the SVR 20, thereby improving the safety of the city's citizens. In still another exemplary embodiment, multiple government agencies may hold a telecom-based video conference with one of the tiled video conference windows showing surveillance cameras suitably switched by the SVR 20. Furthermore, in other embodiments, the entire suite of existing and evolving applications in the IP Multimedia Subsystem (IMS) network can be fully exploited within the video surveillance context. Mobility, billing, voice/data applications and services can be applied to a multitude of video surveillance networks. For example, carriers that use IMS/SIP-based telecom networks may now offer security services relating to video surveillance using the SVR 20.

Figure 10:
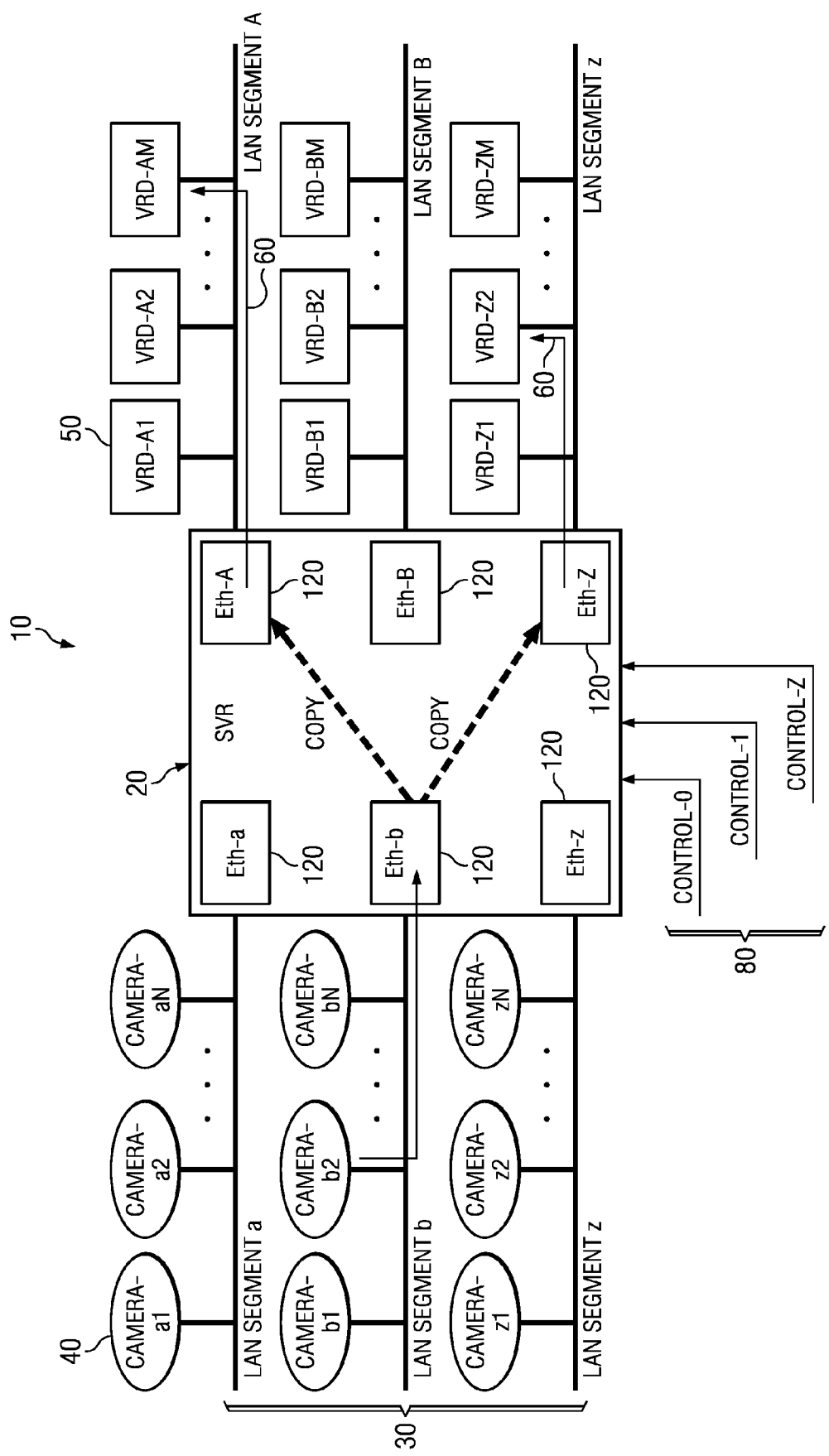

FIG. 10 shows a generalization of a multiport SVR 20. Again, although each NIC 120 may have multiple multi-homed IP addresses connecting to multiple networks, in the embodiment shown in FIG. 10, each NIC 120 is connected to a separate packet-switched network 30, each with its own separate and distinct IP address. In FIG. 10, there are multiple camera LAN network segments (LAN segment a, LAN segment b . . . LAN segment z) and multiple VRD LAN network segments (LAN segment A, LAN segment B . . . LAN segment Z). Each camera LAN network segment 30 includes one or more video surveillance cameras. For example, LAN segment a includes Camera-a1, Camera-a2 . . . . Camera-aN, LAN segment b includes Camera-b1, Camera-b2 . . . . Camera-bN and LAN segment c includes Camera-c1, Camera-c2 . . . . Camera-cN. In addition, each camera LAN network segment 30 is coupled to a respective NIC 120 at the SVR 20.

For example, LAN segment a is coupled to Eth-a, LAN segment b is coupled to Eth-b and LAN segment z is coupled to Eth-z.

Likewise, each VRD LAN network segment 30 includes one or more VRDs 50. For example, LAN segment A includes VRD-A1, VRD-A2 . . . VRD-AM, LAN segment B includes VRD-B1, VRD-B2 . . . VRD-BM and LAN segment Z includes VRD-Z1, VRD-Z2 . . . VRD-ZM. In addition, each VRD LAN network segment 30 is coupled to a respective NIC 120 at the SVR 20. For example, LAN segment A is coupled to Eth-A, LAN segment B is coupled to Eth-B and LAN segment Z is coupled to Eth-Z.

Media from each camera 40 is sent over the respective camera LAN network segment and routed to one or more VRDs 50 over the respective VRD network segment. For example, as shown in FIG. 10, the digital video stream 60 from Camera-bN is sent over LAN Segment b and received at NIC Eth-b of the SVR 20, where it is copied over to NIC Eth-A to be routed to VRD-AM over LAN Segment A. In addition, the digital video stream from Camera-bN is also copied over to NIC Eth-Z to be routed to VRD-Z2 over LAN segment Z.

An example application of the multiport SVR 20 is a scenario in which the cameras 40 are on one or more private LANs, while the various VRDs are remote on one or more different LANs. For example, the multiport SVR 20 could be used in an airport or transportation facility with cameras in various terminals. One terminal may be associated with one LAN, another terminal associated with another LAN, etc. In addition, one VRD network may be the local airport security office, another VRD network may be a remote state police office, and yet another VRD network may be one or more remote TSA offices. Multiple VRD networks can view the various cameras without having a direct connection between the VRD networks themselves. For example, local security and state security can view the airports cameras, but local and state security may not be able to connect to each other's networks.

In addition, as in FIG. 9, the control interfaces 80 for the SVR may be exposed on one, some, or all of the various network interfaces 120, depending on various embodiments and/or on SVR management. The control interfaces 80 may also have various functions and roles, depending on the network interface 120. For example, Control-0 may be used to setup and tear down sessions for cameras 40 on one camera LAN segment, whereas Control-1 may be used to setup and tear down sessions for cameras on another camera LAN segment. As another example, Control-1 may control copying of Source Ports a-m, whereas Control-Z may control copying of Source ports n-z.

Although typically the cameras are connected to one LAN segment and VRDs to another, different LAN segment, in other embodiments, the cameras and VRDs can be mixed on the same network segments. For example, the SVR 20 may be used to switch/route VRDs local to the cameras, as well as switch/route cameras local to the VRDs, i.e., Source and Destination Ports may be mixed together on the various network segments.

Figure 11:
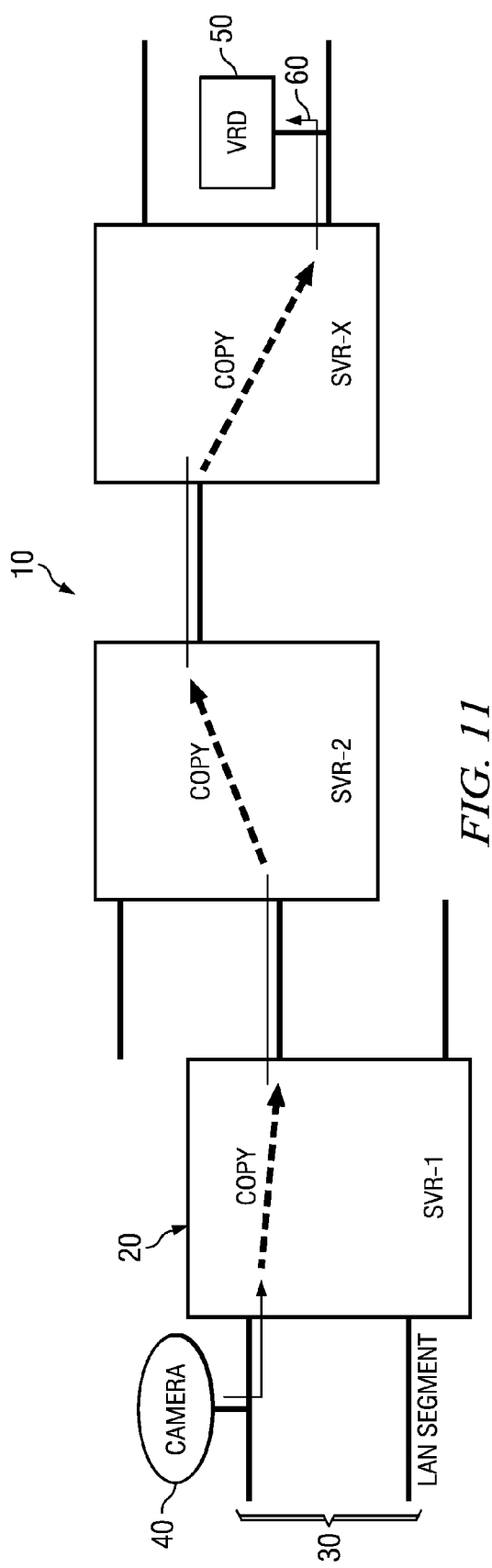
FIG. 11 illustrates cascaded surveillance video routers for routing digital video streams, in accordance with embodiments of the present invention.

Turning now to FIG. 11, multiple SVRs 20 (e.g., SVR-1, SVR-2 . . . SVR-X) can be cascaded together in a variety of ways to accommodate system requirements. In FIG. 11, each SVR 20 can be coupled to one or more packet-switched networks 30 to enable the digital video stream 60 from camera 40 to be routed to VRD 50 by traversing multiple cascaded SVRs 20. The "virtual camera" output of each SVR 20 acts as the "real camera" input for the next SVR. Thus, the input of SVR-2 can act as a VRD for the output of SVR-1.

Cascading SVRs 20 allows for many different types of distributed system designs and architectures. As one example, instead of using one large and central SVR, the system 10 can instead be broken into various distributed SVRs. As a second example, large video surveillance systems could be designed in a hierarchical fashion. Cascaded SVRs also allow for federation of camera networks, with fine-grain control over which cameras are viewed by which VRDs. In addition, cascaded SVRs also facilitate efficient bandwidth usage, since streams from cameras are switched/routed only when and where they need to travel.

In a cascaded SVR system, many video streams could potentially be travelling from one SVR to another. However if there exists some intermediate network containing NATs, firewalls, data routers, and the like in-between SVRs, a complex process may be required for managing NAT traversal, port mapping, firewall pinhole opening, etc. For example, if 1000 virtual camera streams are travelling from SVR-1 to SVR-2, this may require the mapping of 1000 ports within the management consoles of the multiple network devices in-between SVRs, which can be error-prone, time-consuming and costly during the system installation and commissioning.

Figure 12:
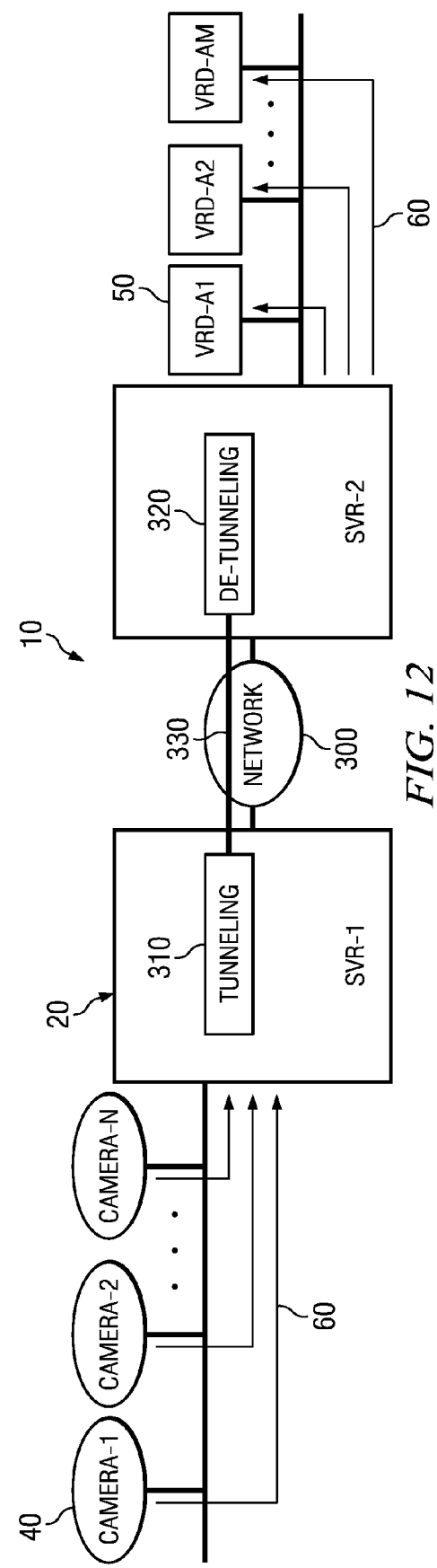
FIG. 12 illustrates an IP tunneling mechanism for routing digital video streams, in accordance with embodiments of the present invention.

Therefore, in accordance with further embodiments of the present invention, as shown in FIG. 12, the SVR 20 can implement a tunneling procedure. As can be seen in FIG. 12, only a single connection is established as a tunnel 330, thereby facilitating the exchange of media and signaling between SVRs 20 while traversing one or more intermediate networks 300. Multiple digital video streams 60 from multiple cameras 40 are encapsulated, or tunneled by one SVR (e.g., SVR-1) using a tunneling module 310, and decapsulated, or de-tunneled, by another SVR (e.g., SVR-2) using a de-tunneling module 320. In general, a tunnel 330 can be setup and established by either of the SVRs. For example, if SVR-1 is behind a NAT/Firewall, and SVR-2 is on the Internet, it may be more convenient for SVR-1 to establish the tunnel because this automatically opens the connection through the NAT/Firewall, rather than SVR-2 establishing the tunnel to SVR-1 because this requires manual management of the firewall to open/allow an incoming connection from the internet to the LAN.

In one embodiment, the tunnels 330 could be based upon IPSEC, VPN, SSL/TLS or other technologies. These technologies could also be used with the SVR API Control Interface to select which of the streams enter the tunnel and which streams instead travel directly to one or more other SVRs.

It should be noted that SVRs can support multiple tunnels simultaneously. For example, SVR-1 may support two tunnels, one to SVR-2 and another to a different SVR, while SVR-2 supports four tunnels to four other SVRs. Each tunnel can be setup/established independently by either one SVR or the other.

Figure 13:
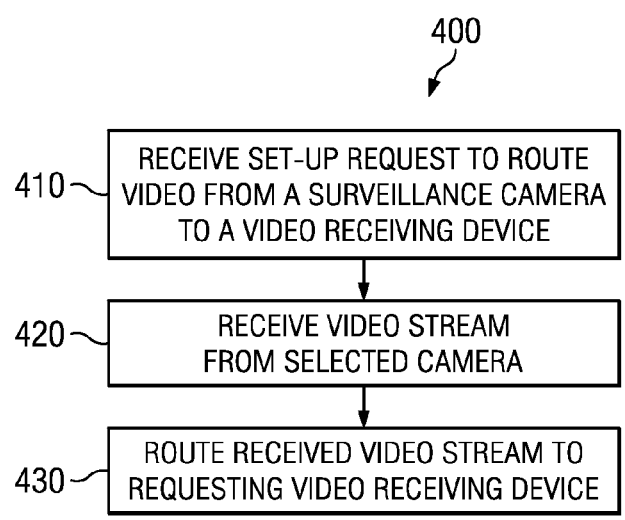
FIG. 13 illustrates an exemplary method for routing a digital video stream captured by a remote surveillance camera to a video receiving device, in accordance with embodiments of the present invention.

FIG. 13 is a flowchart illustrating an exemplary process 400 for routing a digital video stream captured by a remote surveillance camera to a video receiving device, in accordance with embodiments of the present invention. The process begins at block 410, where a request is received at a surveillance video router to route a first digital video stream generated by a first remote surveillance camera to a first video receiving device via a packet-switched network. At block 420, the first digital video stream is received from the first remote surveillance camera at the surveillance video router via the packet-switched network. Finally, at block 430, the first digital video stream is routed to the first video receiving device by the surveillance video router.

As will be recognized by those skilled in the art, the innovative concepts described in the present application can be modified, varied and adapted over a wide range of applications. Accordingly, the scope of patents subject matter is not limited to any of the specific exemplary teachings discussed, but is instead defined by the following claims.

The invention claimed is:

1. A surveillance video router for routing digital video streams to video receiving devices, comprising:
   a network interface coupled to a packet-switched network to enable communication with the video receiving devices and to receive respective digital video streams captured by remote surveillance cameras; and
   a processor including a rule-based engine having a video analytic system for video analytic processing of content within the digital video streams, the rule-based engine dynamically selecting a first digital video stream generated by a first remote surveillance camera for routing to a first video receiving device based on the video analytic processing of the content within the digital video streams, the processor further for routing the first digital video stream to the first video receiving device via the network interface.

2. The surveillance video router of claim 1, further comprising:
   a plurality of logical source ports, each for receiving one of the digital video streams; and
   a plurality of logical destination ports, each for communicating with at least one of the video receiving devices;
   wherein the processor copies the first digital video stream from a respective one of the logical source ports for the first digital video stream to a respective one of the logical destination ports for the first video receiving device to route the first digital video stream to the first video receiving device.

3. The surveillance video router of claim 2, wherein the processor receives a Session Setup Signaling Hyper Text Transfer Protocol (HTTP) request at the logical destination port for the first video receiving device and routes the first digital video stream to the first video receiving device within an HTTP response.

4. The surveillance video router of claim 3, wherein the HTTP response includes Real Time Streaming Protocol (RTSP) over Real Time Protocol (RTP) packets or a series of Motion Joint Photographic Experts Group (MJPEG) frames.

5. The surveillance video router of claim 2, wherein the processor initiates a video session with the first remote surveillance camera by issuing a Session Setup Signaling HTTP request from an Internet Protocol (IP) address of the surveillance video router and the logical source port of the first remote surveillance camera, and receives the first digital video stream from the first remote surveillance camera within an HTTP response.

6. The surveillance video router of claim 2, wherein the processor further receives a request to route the first digital video stream to an additional video receiving device via the network interface.

7. The surveillance video router of claim 6, wherein the first video receiving device and the additional video receiving device are each coupled to the same logical destination port.

8. The surveillance video router of claim 6, wherein the processor further copies the first digital video stream from the respective one of the logical source ports to an additional respective one of the logical destination ports for the additional video receiving device to route the first digital video stream to the additional video receiving device.

9. The surveillance video router of claim 8, wherein the processor further transcodes the first digital video stream to produce a transcoded digital video stream and routes the transcoded digital video stream to the additional video receiving device.

10. The surveillance video router of claim 1, wherein the processor further processes the first digital video stream to produce a processed digital video stream and routes the processed digital video stream to the first video receiving device.

11. The surveillance video router of claim 1, wherein the network interface includes at least one first network interface card for communicating with the remote surveillance cameras via at least one first packet-switched network and at least one second network interface card for communicating with the video receiving devices via at least one second packet-switched network.

12. The surveillance video router of claim 1, wherein the processor further routes the first digital video stream together with other digital video streams to the first video receiving device in an Internet Protocol (IP) tunnel.

13. The surveillance video router of claim 1, wherein the first video receiving device includes a display device, a video management system, a video analytic system, a video recorder or an additional surveillance video router.

14. A method for routing digital video streams captured by remote surveillance cameras to video receiving devices, comprising:
   receiving the digital video streams from the remote surveillance cameras at a surveillance video router via a packet-switched network;
   processing, by a rule-based engine within the surveillance router, the digital video streams, the rule-based engine having a video analytic system for video analytic processing of content within the digital video streams;
   dynamically selecting, by the rule-based engine, a first digital video stream generated by a first remote surveillance camera for routing to a first video receiving device based on the video analytic processing of the content within the digital video streams; and
   routing the first digital video stream to the first video receiving device by the surveillance video router.

15. The method of claim 14, wherein the routing further comprises:
   copying the first digital video stream from a respective one of a plurality of logical source ports on the surveillance video router to at least one of a plurality of logical destination ports on the surveillance video router to route the first digital video stream to at least the first video receiving device.

16. The method of claim 14, wherein the routing further comprises:
   routing the first digital video stream together with other digital video streams to the first video receiving device in an Internet Protocol (IP) tunnel.

17. The method of claim 14, further comprising:
   receiving a request to route the first digital video stream to an additional video receiving device.

18. The method of claim 17, wherein the request is received as a control input from a third party source.

19. The method of claim 14, wherein the routing further comprises:
   routing the first digital video stream together with other digital video streams to the first video receiving device in an Internet Protocol (IP) tunnel.

20. The method of claim 14, wherein the processing further comprises:
   processing the first digital video stream to produce a processed digital video stream, the processed digital video stream being routed to the first video receiving device.

* * * * *